United States Patent [19]
Reimers

[11] 3,878,932
[45] Apr. 22, 1975

[54] CONTAINER ARRESTER FOR HYDROSTATIC COOKER

[75] Inventor: James L. Reimers, Saratoga, Calif.

[73] Assignee: FMC Corporation, San Jose, Calif.

[22] Filed: Jan. 22, 1973

[21] Appl. No.: 325,702

[52] U.S. Cl..................................... 198/26; 198/45
[51] Int. Cl............................................. B65g 47/00
[58] Field of Search .................. 198/26, 43, 45, 29; 221/289, 296, 83

[56] References Cited
UNITED STATES PATENTS
2,512,684  6/1950  Shontz .................................. 221/84
3,543,908  12/1970  Holland .............................. 198/26
FOREIGN PATENTS OR APPLICATIONS
1,007,679  5/1957  Germany ............................. 198/26

Primary Examiner—James B. Marbert
Assistant Examiner—Douglas D. Watts
Attorney, Agent, or Firm—C. E. Tripp

[57] ABSTRACT

A hydrostatic cooker for rows of cans or containers has a discharge loop which releases processed containers and drops them on to a continuously running conveyor. In order to precisely align each row of containers before it falls on the conveyor, an eccentrically mounted, rotatable arrester bar cooperates with a discharge lip on the cooker shell to arrest and suspend a row of containers directly above the conveyor, whereupon the eccentric arrester bar is turned 90° to release the containers and drop the row for free fall directly onto the discharge conveyor thereby insuring axial alignment of the containers within each row when they reach the continuously running conveyor.

2 Claims, 5 Drawing Figures

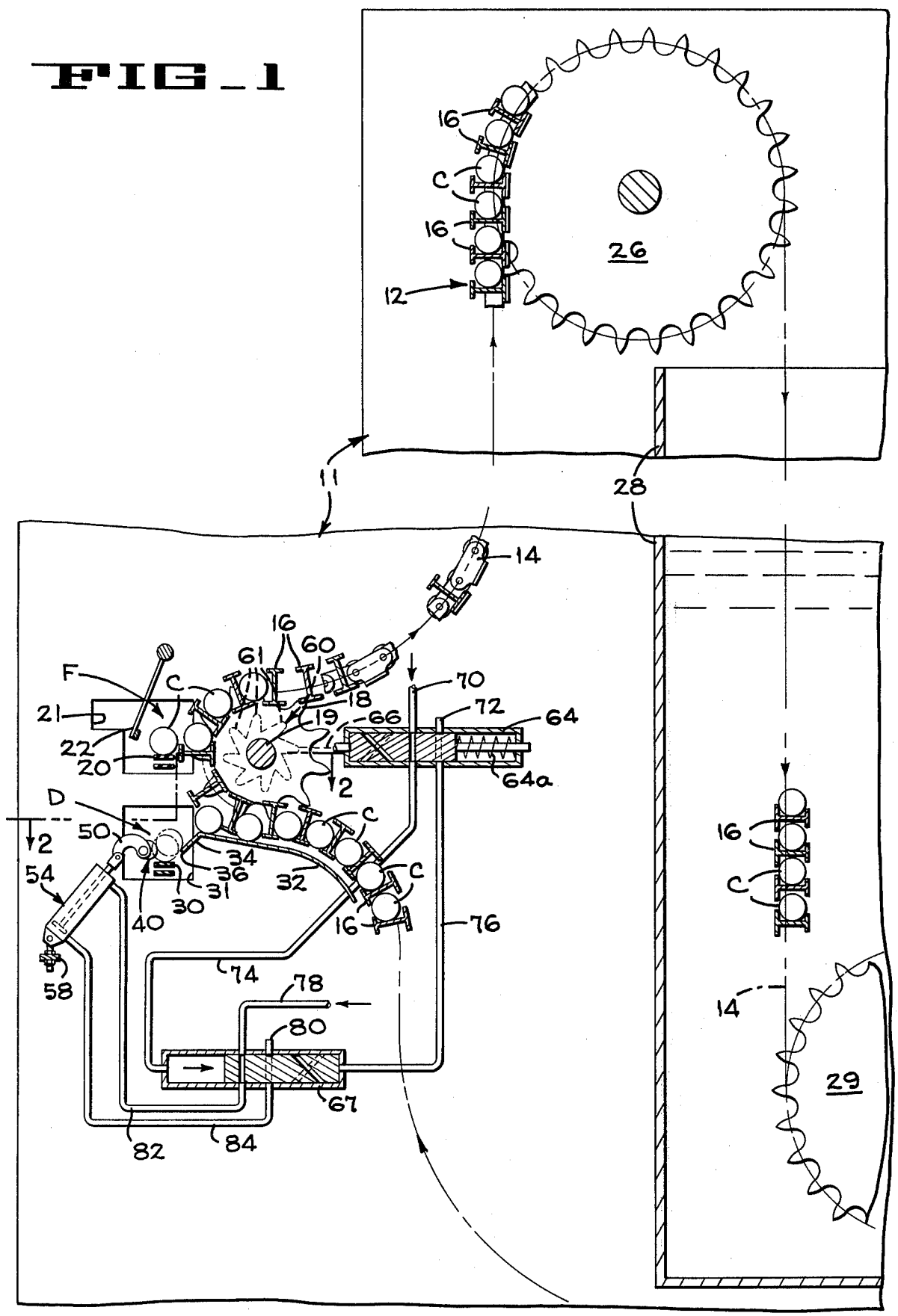
FIG_1

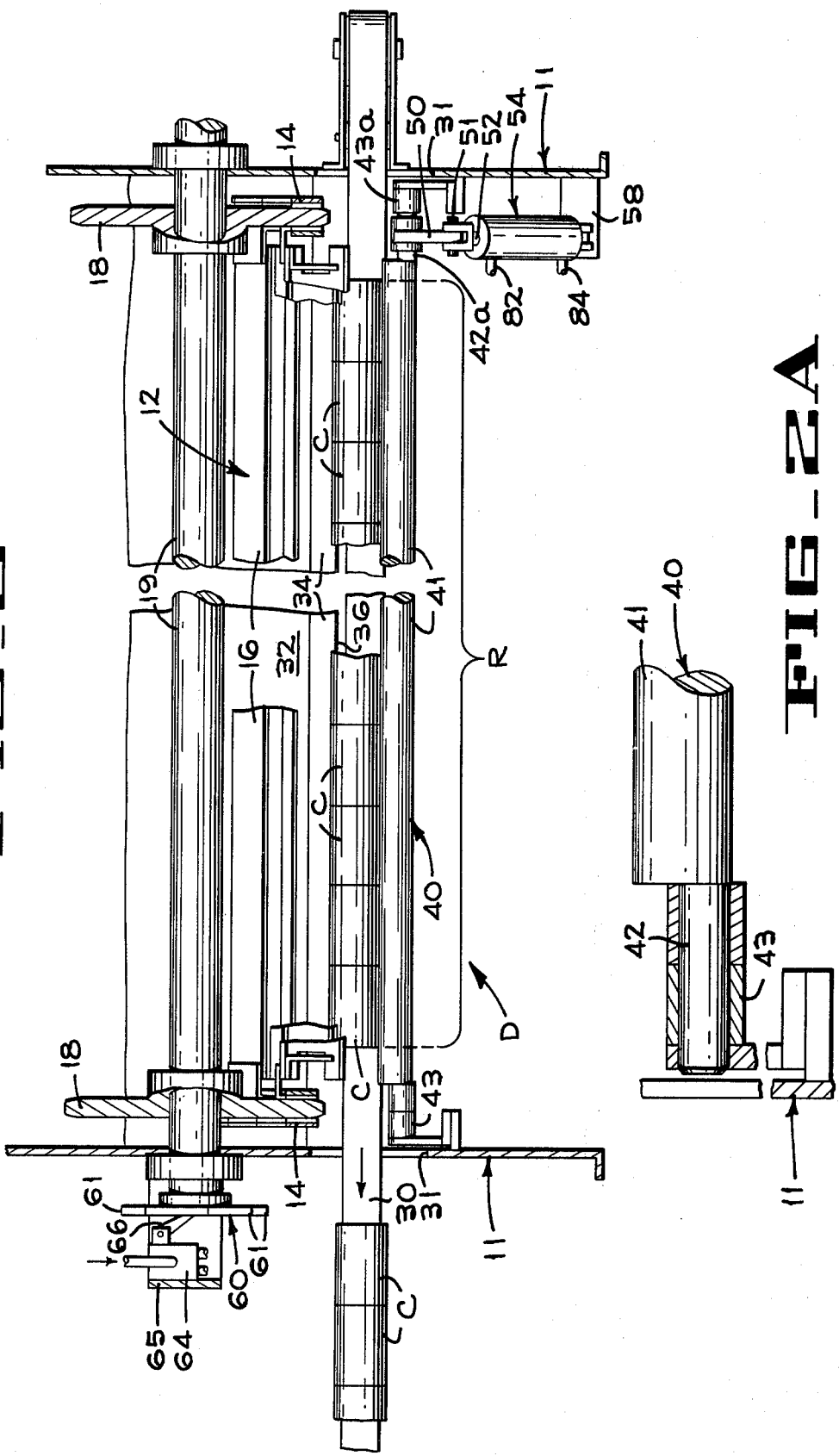

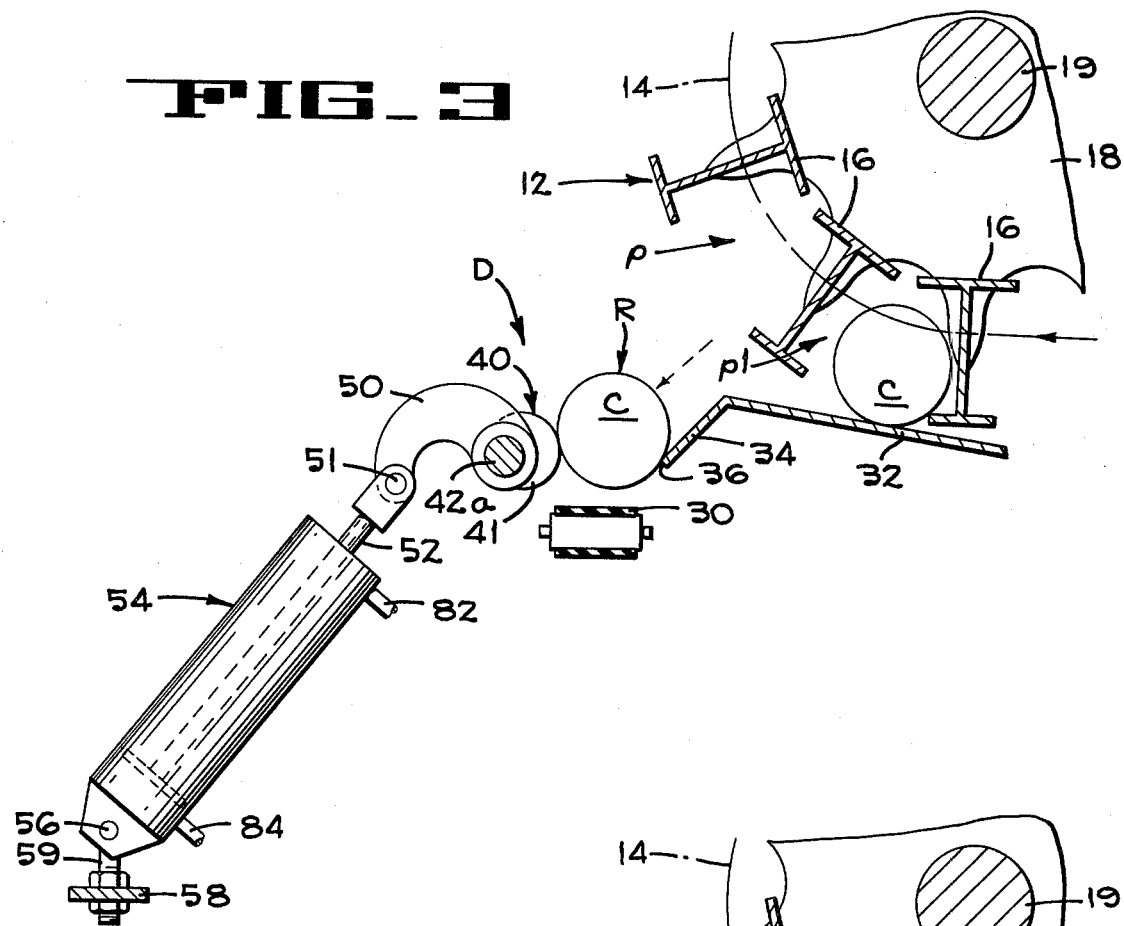

CONTAINER ARRESTER FOR HYDROSTATIC COOKER

FIELD OF THE INVENTION

This invention relates to hydrostatic cookers for containers and more particularly to an arrester bar mechansim for precisely aligning the discharged row of processed containers before the row falls on a continuously moving take-away conveyor belt.

DESCRIPTION OF PRIOR ART

The need for aligning a discharged row or "stick" of processed containers from a hydrostatic cooker for depositing them on a take-away conveyor belt is recognized in the United States patent to Holland U.S. Pat. No. 3,543,908, Dec. 1, 1970. In this patent a stop plate extends between two pivotally mounted arms which are raised and lowered by an air cylinder. When the stop plate is raised, a discharged row of cans is momentarily arrested. When the stop plate is lowered, the discharged row of cans rolls across the stop plate and onto a transfer platform from which they roll alternately onto one or the other of two take-away conveyors. Although the stop plate of the Holland patent will serve to initially align the discharged row of processed containers after they have been released from the carrier bars, the rolling action and transfer action that follows this alignment is such that a new misalignment of the containers could take place before the row of containers reaches the take-away conveyor. Since the take-away conveyor is continuously moving, any slight relative hang back between one or more containers in the row, that takes place during the re-distribution action of Holland, will merely re-establish the problem that was intended to be solved.

SUMMARY OF THE INVENTION

As previously stated, since the take-away conveyors of hydrostatic cookers of the type to which this invention relates are continuously moving, if a row or stick of processed containers is released to the conveyor in a manner whereby some containers reach the conveyor slightly before others, the first containers to reach the conveyor will have moved along slightly on the conveyor belt before the late arrivals reach the belt. Thus the late containers will fall on those already on the conveyor, because of motion of the conveyor during the delay. This will result in a jumbled or misaligned row of containers being carried away for further handling or processing.

In accordance with the present invention, secondary misalignment between the time that the discharged row of processed containers has been arrested and the time they drop onto the conveyor is prevented by utilizing a different principle of arresting and discharge. In accordance with the present invention, an eccentrically mounted arresting bar is spaced horizontally from and cooperates with the discharge lip in a manner whereby when the arresting bar is advanced towards the lip the discharged row of processed containers is not only arrested but is actually suspended by being gripped between the arresting bar and the lip. The take-away conveyor is spaced closely below the suspended row of containers and when the arresting bar is retracted, the entire row of containers is released for free fall directly onto the take-away conveyor. Since the take-away conveyor is only a short distance below the containers, there is substantially no time for establishment of a new misalignment and furthermore no problem arises from rebound of the containers. As a result of this improvement over the construction of the aforesaid Holland patent, a simpler and more effective arresting system is provided for insuring that rows of containers will be precisely aligned as they reach and are carried away by the continuously moving take-away conveyor.

BRIEF DESCRIPTION OF THE DRAWINGS

FIG. 1 is a fragmentary diagram of a feed and discharge portion of a hydrostatic cooker embodying the present invention.

FIG. 2 is a horizontal section taken along line 2 — 2 of FIG. 1 showing the discharge station of the present invention.

FIG. 2A is an enlarged view of the mounting of one end of the arrester bar.

FIG. 3 is an operational diagram showing the arrester bar arresting a row of containers.

FIG. 4 is a view like FIG. 3 showing the arresting bar after it has released a row of containers.

DETAILED DESCRIPTION

A hydrostatic cooker embodying the present invention can be of the double chain type such as that of Lee U.S. Pat. No. 3,286,619, Nov. 22, 1966, or of the single chain type such as that shown in Reimers et al. U.S. Pat. No. 3,394,793, July 30, 1968. In hydrostatic cookers of the type referred to, the processing conveyor or chain of carriers passes around a pair of relatively small diameter sprockets which flexes the chain and opens adjacent carriers to a position for discharge of containers after processing in various water legs and a steam chamber. Unprocessed containers can also be fed into the carriers at the same sprockets, in accordance with conventional practice.

Referring principally to the diagram of FIG. 1 and with some reference to FIG. 2, the pertinent elements of a hydrostatic cooker 10 embodying the present invention are disclosed, it being understood that the complete cooker is of the general configuration such as that shown on the aforementioned Lee or Reimers et al patents.

The cooker includes side plates or frame members 11 and a long processing conveyor 12 composed of side chains 14 bridged by I beam carriers 16 for conveying rows of sticks of containers C through the cooker. Newly introduced containers proceed from a feed station F, through the water legs and processing chamber, to a discharge station D. It is to be understood that the configuration of the carriers 16 is not critical to the present invention, the I beam type carriers shown being of a configuration well known in the art.

At the feed and discharge stations F, D, the side chains 14 supporting the carriers 16 are trained around a relatively small radius loop by means of spaced side sprockets 18 on a driven shaft 19 (see FIG. 2), the drive not being shown. The containers C enter the feed station F on an endless conveyor belt 20 passing through openings 21 in the side plates 11, and rows or sticks of containers are pushed between the adjacent carriers 16 by a pusher 22 in a manner well known in the art and not critical to the present invention. After leaving the feed and discharge loop, the carriers 16 close upon and retain the rows of carriers C and carries them up around a first pair of upper sprockets 26, which also may be driven. The conveyor 12 then passes down through the first water leg 28 whereupon the conveyor is trained around a lower sprocket 29 and up into the processing, sterilizing or cooking chamber of the cooker in a manner well known in the prior art and illustrated in the aforesaid patents. The conveyor 12 is guided around various bends in its processing path by side channels (not shown) in a conventional manner, these channels not forming a part of the present invention.

The container arresting and release mechanism of the present invention is disposed at the discharge station D and will now be described in detail.

As seen in FIG. 2, rows of containers C released from adjacent carriers 16 are first arrested by the discharge mechanism of the present invention just above the upper reach of a continuously driven take-away conveyor 30 passing through openings 31 in the side plates 11. As mentioned previously, it is the purpose of the present invention to insure that these rows are deposited uniformly onto the conveyor 30, with the containers in precise end-to-end relation, even though the conveyor is a continuously moving conveyor. As was also previously mentioned, if some containers in a row reach the conveyor 30 before others, the original end-to-end relationship of the containers in the row will be lost, and misalignment, jumbling and interference will take place.

As seen in FIG. 1, as the conveyor 12 approaches the discharge station D, a shield or guide plate 32 curves around under the conveyor and this plate terminates in a downwardly inclined discharge lip 34 having a free edge or end 36 that is disposed a relatively short distance above the upper reach of the take-away conveyor 30. Preferably this distance is substantially less than the diameter of the containers C, (see FIG. 4).

In order to first arrest a row or stick R (FIG. 2) of containers C and then drop the row precisely onto the discharge or take-away conveyor 30, an eccentrically mounted arrester bar 40 is disposed opposite the edge 36 of the downwardly inclined guide lip 34 at the discharge station D. In the preferred embodiment of the invention, the arrester bar 40 is formed as a cylindrical shaft like member 41 having eccentrically disposed end bearings or extensions 42 at one end (see FIG. 2A) and similar extensions 42a at the other end (FIG. 2). The arrester bar eccentric extensions 42, 42a are mounted in bearings 43, 43a secured to the side plates 11 of the cooker and oscillation of the arrester bar 40 about the axis of the eccentric extensions 42, 42a will cause the arrester bar member 41 to move toward and away from the edge 36 of the downwardly inclined guide lip 34.

In order to swing the eccentrically mounted member 41 of the arrester bar 40 from its container arresting position (FIG. 3) to its container release position (FIG. 4), a crank arm 50 is pinned or otherwise secured to the eccentric extension 42a at one end of the arrester bar. In order to oscillate the crank 50 to move the arrester bar member 41 between its two critical positions, the free end of the crank is pivotally connected at 51 to the piston rod 52 of a linear actuator 54. The linear actuator is pivotally mounted at 56 to a bracket 58 secured to one of the side plates 11 of the cooker. Precise adjustment is provided by forming the pivot 56 on an adjustably mounted bolt 59.

In the preferred embodiment of the invention, the linear actuator 54 is fluid operated (preferably compressed air) and its operation is synchronized with the critical positions of the carriers 16 at the feed and discharge sprockets 18 by means of a synchronizing cam wheel 60. The cam wheel 60 is mounted on the shaft 19 for the feed and discharge sprockets 18 and has lobes 61 that correspond or are in analogue to the pockets for the rows R of containers C formed by two adjacent carriers 16. In other words, by the time a pair of adjacent carriers 16 is opened up at the guide 32 at the discharge station D, and before the discharged containers roll down the discharge lip 34, one of the lobes 61 on the cam wheel 60 will have caused the actuator 54 to close the arrester bar 40, but the next lobe 61 will be approaching a position whereby it will cause the linear actuator 54 to open the arrester bar 40.

As seen in FIG. 2, a four way valve pilot 64 is mounted on a bracket 65 connected to the frame of the machine and the valve 64 has a spring biased actuator arm 66 that is tripped and released by each lobe 61 of the cam wheel 60. The four way pilot valve 64 is shown schematically in FIG. 1 with the mechanical operation of the actuator 66 by the cam lobes 61 indicated as a broken line. The pilot valve 64 is of the mechanically actuated, spring return type.

The pilot valve 64 controls the linear actuator 54 through a slave valve 67, also shown schematically in FIG. 1. The fluid circuit, which is also illustrated diagramatically in FIG. 1, includes a fluid supply line 70, and an exhaust line 72 for the pilot valve 64. Pilot lines 74, 76 lead from the pilot valve 64 to opposite ends of the slave valve 67 for the linear actuator. The slave valve 67 is also a four way valve and is provided with a fluid inlet line 78 and an exhaust line 80. Actuator operating lines 82, 84 lead from the slave valve 67 to opposite ends of the linear actuator 54 for oscillating the arrester bar 40. The lines 82, 84 between the slave valve 67 and the linear actuator 54 alternately serve as pressure and exhaust lines.

When the pilot valve 64 is in the position shown in FIG. 1, the return spring 64a of the pilot valve has shifted the valve to a position wherein fluid from the supply line 70 is directed to the left end of the slave valve 67. This connects fluid under pressure from the supply line 78 for the slave valve to the line 82 for the actuator 54, which retracts the piston 52 of the linear actuator and rotates the crank 50 to the position shown in FIG. 3. This is the position that arrests a row of containers C released from the conveyor and holds them above the discharge conveyor 30. When the next lobe 61 of the cam wheel 60 actuates the mechanical actuator 66 of the pilot valve 64, the pilot valve is shifted against the force of the spring 64a to reverse the connections to the slave valve 67. With these connections reversed, the slave valve 67 is shifted from the position shown in FIG. 1 to a position wherein the valve member is moved to the left, which also reverses the connections of the pressure and exhaust lines 78, 80 to the lines 82, 84 leading to the linear actuator 54. With these reverse connections established, the piston 52 of the linear actuator 54 is advanced and rotates the crank 50 to the position shown in FIG. 4, which retracts the eccentric arrester bar member 41 and drops the row of previously arrested containers C onto the discharge conveyor 30.

The details of the operation of the arrester bar 40 and the guide lip 34 of the present invention will now be further described in connection with FIGS. 3 and 4.

Referring to FIG. 3, a row R (FIG. 2) of containers C has been released from a pocket *p* between adjacent carriers 16 and the containers have rolled down the guide lip 34 to be arrested by the arrester bar 40, which has been rotated to its advance or container arresting position. It will be noted in FIG. 3 that the containers C are suspended substantially above the discharge conveyor 30 between the edge 36 of the downwardly inclined guide lip 34 and the eccentric member 41 of the arrester bar 40. It will also be noted that the containers are only a short distance above the discharge conveyor 30 and in fact are at a distance of less than half the diameter of the containers above the conveyor. The timing of the lobes 61 on the cam wheel 60 (FIG. 1) is such that the rester bar 40 remains in the position of FIG. 3 for a period of time long enough to insure that the entire row R (FIG. 2) of containers C will settle into the suspended or arrested position between the lip edge 36 and the eccentric member 41.

Shortly after the condition of FIG. 3 is attained and while the next approaching row of containers C is still in a pocket *p1* between the next adjacent carriers 16, the row of containers previously arrested by the arrester bar will be released and dropped directly onto the discharge conveyor 30. Completion of this operation is shown in FIG. 4. In order to thus deposit the row of containers on the conveyor 30, and as previously described, the piston 52 of the linear actuator 54 is extended by the valve mechanism under control of the cam wheel 60. Extension or advance of the actuator position 52 rotates the crank 50 and turns the eccentric arrester bar member 41 about 90° in the clockwise direction, as viewed in FIG. 4. The row of containers previously suspended in neat end-to-end relation and substantially directly above the discharge conveyor 30 is thus released in a manner wherein all containers in the row drop simultaneously onto the upper reach of the moving conveyor 30. In this manner, there is no overlapping or interference between adjacent containers in a row, as the containers are deposited on the moving discharge conveyor 30, because a fully formed, linearly aligned row of containers had been formed and suspended just before the release of the row of containers to the conveyor. It will also be noted that due to the fact that the distance through which the row of containers must fall to reach the conveyor 30 is quite small, no bouncing problems, with attendant misalignment of the row, are present.

Since the conveyor 30 is continuously moving, the row R of containers deposited on the conveyor 30 as shown in FIG. 4, will be rapidly removed from beneath the lip 34 and the arrester bar 40, whereupon the cam wheel 60 actuates the pilot valve 64 in the fluid control system to retract the piston 52 and place the arrester bar 40 in the container arresting position of FIG. 3. This will take place before the approaching row of containers in the pocket *p1* between adjacent approaching carriers 16 is released and rolls to the position of the previously arrested row shown in FIG. 3. Thus, since the arrester bar 40 will be in the closed position of FIG. 3 sufficiently long for the next row of containers to be released and to roll down to the arrester bar, each row is perfectly aligned ready for a short drop onto the discharge conveyor.

Thus, in conclusion it can be seen how the container arresting and discharge system of the present invention provides precisely aligned rows of containers and drops them in a precise and orderly manner onto a continuously moving discharge conveyor.

Although the best mode contemplated for carrying out the present invention has been herein shown and described, it will be apparent that modification and variation may be made without departing from what is regarded to be the subject matter of the invention.

What I claim is:

1. Mechanism for discharging a row of processed containers from the carriers of a cooker or the like onto a horizontally moving conveyor, said apparatus comprising a stationary platform for receiving containers directly from the carriers and along which the containers roll, and an arrester for first arresting a row of containers and then releasing the row to the conveyor; the improvement wherein said platform includes a stationary downwardly inclined guide lip having a discharge end portion with a free edge, said arrester comprising a rotatable eccentrically mounted elongate bar disposed substantially horizontally opposite the discharge end portion of said guide lip, means for advancing the arrester toward said lip and retracting it away from the lip, said arrester advancing means comprising means for partially turning said eccentrically mounted bar from its container releasing position to its container arresting position, said arrester retracting means comprising means for partially turning said eccentrically mounted bar back to its releasing position, said arrester when advanced cooperating with the end portion of said lip to suspend a row of discharged containers in axial alignment directly above said discharge conveyor between the end portion of said lip and the arrester, said conveyor being directly below and open to the gap between said lip and said arrester when the arrester is retracted, said arrester retracting means moving the arrester away from said lip by a distance sufficient to completely release and drop the discharged row of aligned containers for vertical free fall between the free edge of said discharge end portion of said lip and said arrester and directly onto said underlying discharge conveyor.

2. The discharge mechanism of claim 1, wherein said eccentrically mounted bar turning means comprises crank means connected to the mounting for said bar, and a double acting linear actuator connected to said crank means.

* * * * *